United States Patent [19]
Allen et al.

[11] Patent Number: 5,894,381
[45] Date of Patent: Apr. 13, 1999

[54] LOW MASS SECTIONED LOAD BEAM OF HEAD GIMBAL ASSEMBLY HAVING INCREASED HIGH FIRST TORSION FREQUENCY MODE

[75] Inventors: Adolph M. Allen, Oakland; Jamshid Bozorgi, Fremont, both of Calif.

[73] Assignee: Read-Rite Corporation, Milpitas, Calif.

[21] Appl. No.: 08/892,457

[22] Filed: Jul. 14, 1997

Related U.S. Application Data

[63] Continuation-in-part of application No. 08/788,136, Jan. 24, 1997, Pat. No. 5,844,752.

[51] Int. Cl.$^6$ ............................................. G11B 5/48
[52] U.S. Cl. .................................................. 360/104
[58] Field of Search ....................................... 360/104

[56] References Cited

U.S. PATENT DOCUMENTS 5,291,359  3/1994  Wolter ................................. 360/104
5,313,353  5/1994  Kohso ................................. 360/104
5,623,758  4/1997  Brooks ................................ 360/104

*Primary Examiner*—A. J. Heinz
*Attorney, Agent, or Firm*—Nathan N. Kallman

[57] ABSTRACT

A load beam of a head suspension assembly includes a base plate attachment segment, and an intermediate region that extends integrally from the base plate attachment segment. A bend region extends integrally from the intermediate region for providing the load beam with a predetermined preload spring force and for increasing the lateral stiffness of the load beam. A forward section extends from the bend region, so that the center of gravity of the bend region and forward section is shifted toward the base plate attachment in order to improve the shock performance of the load beam, and so that a moment arm of the bend region and the forward section is shortened. In a preferred embodiment the intermediate region is wider than the base plate attachment segment.

10 Claims, 7 Drawing Sheets

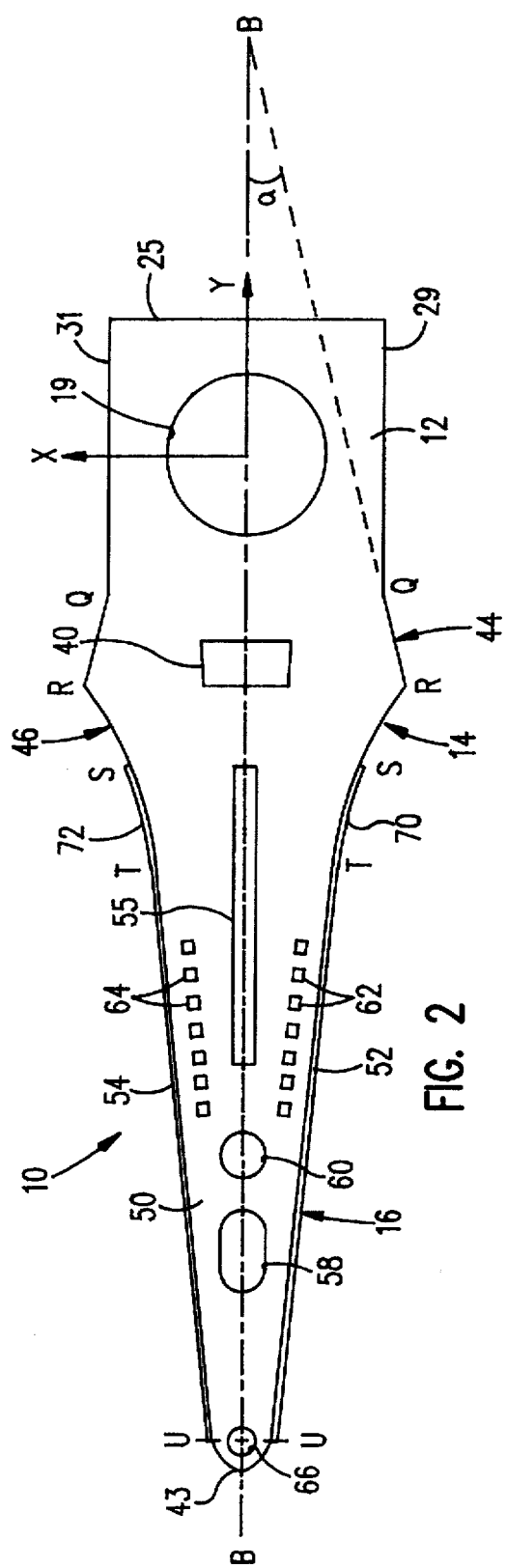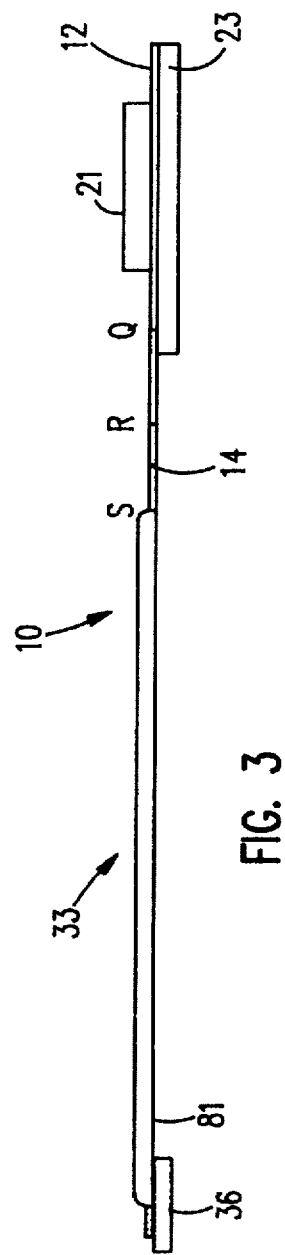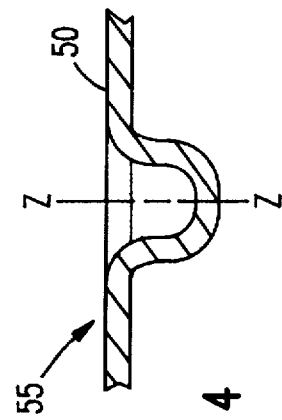
FIG. 2
FIG. 3
FIG. 4

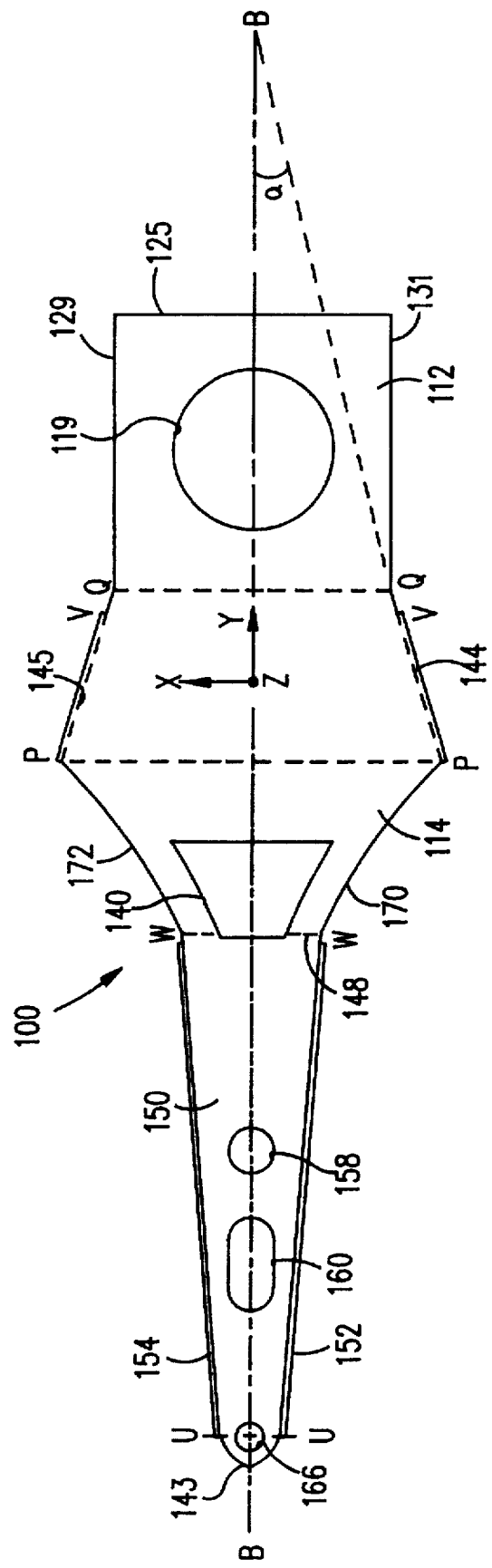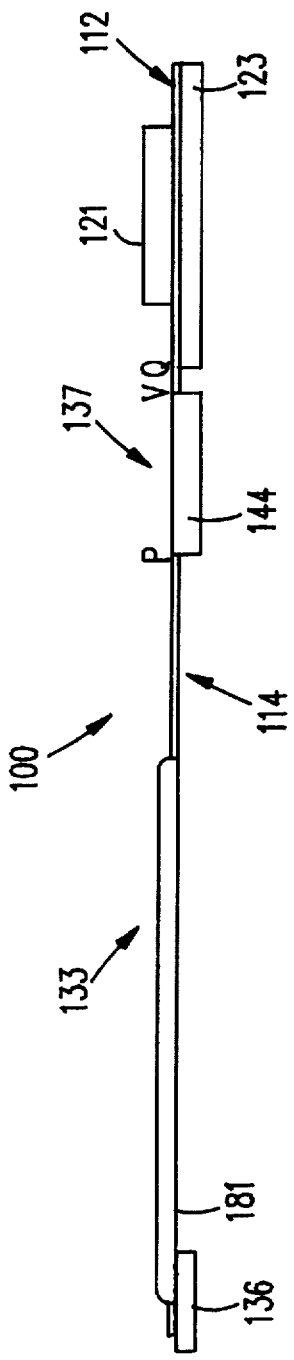
FIG. 6
FIG. 7

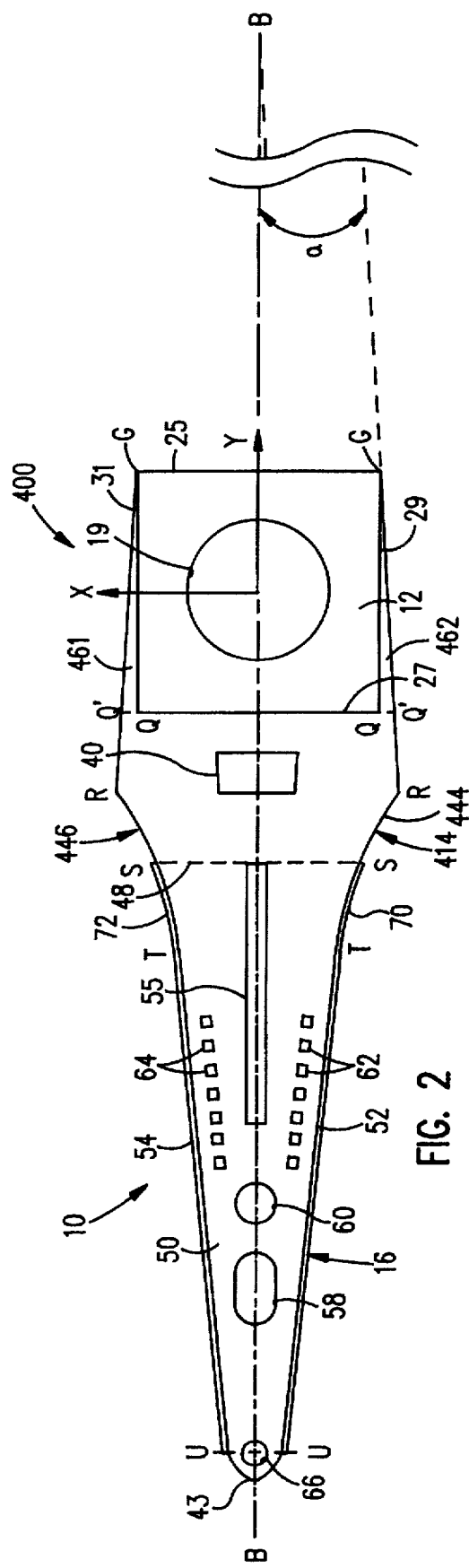

LOW MASS SECTIONED LOAD BEAM OF HEAD GIMBAL ASSEMBLY HAVING INCREASED HIGH FIRST TORSION FREQUENCY MODE

CROSS-REFERENCE TO RELATED APPLICATION

The present application is a continuation-in-part of copending U.S. patent application Ser. No. 08/788,136 filed Jan. 24, 1997 now U.S. Pat. No. 5,844,752 on behalf of the same inventors and assigned to the same assignee, which application is incorporated herein by reference.

FIELD OF THE INVENTION

This invention relates to disk drive head suspension assemblies and in particular to a load beam of a head gimbal assembly.

DESCRIPTION OF THE PRIOR ART

A typical disk drive includes one or more head suspension assemblies (HSAs) formed of load beams and head gimbal assemblies (HGAs). Each HGA includes a slider that is pivotally attached to a flexure. A magnetic transducer is disposed on the slider for interaction with a magnetic disk or medium during operation of the disk drive.

During operation, the load beam is subject to oscillation and vibration, particularly at the structural resonance frequencies, and is also subject to bending and twisting forces and sway or lateral displacement. During the seek mode, when the magnetic head accesses the data tracks and is moved radially between selected data tracks, the load beam may experience undue vibration at resonance frequencies. Also, the HGA can experience an external mechanical shock, typically in a nonoperating mode, which may result in mechanical failure of the head, the disk, or both.

One objective in load beam designs is the reduction of the rail height for minimizing the profile of the HGA. However, rail height is limited by several factors such as disk drive overall dynamic performance, integrity and stiffness.

Therefore, there is still a need for a load beam design that increases the high first torsion frequency mode and possibly the second torsion frequency mode for improved positioning performance in high areal density applications. The desired load beam should be able to sustain a high shock excitation with minimal separation of the head from the disk, which may occur, particularly in laptop computers.

SUMMARY OF THE INVENTION

An object of the present invention is to provide a low mass load beam of a head suspension assembly that optimizes at least the first and second torsion frequency modes, while sustaining a high shock excitation with minimal separation of the head from the disk.

According to this invention, the load beam includes a base plate attachment segment, and an intermediate region that extends integrally from the base plate attachment segment. A bend region extends integrally from the intermediate region for providing the load beam with a predetermined preload spring force and for increasing the lateral stiffness of the load beam. A forward section extends from the bend region, so that the center of gravity of the bend region and forward section is shifted toward the base plate attachment in order to improve the shock performance of the load beam, and so that a moment arm of the bend region and the forward section is shortened. In a preferred embodiment the intermediate region is wider than the base plate attachment segment.

BRIEF DESCRIPTION OF THE DRAWINGS

The invention will be described in greater detail with reference to the drawing in which:

FIG. 2 is a top plan view of the load beam of FIG. 1;

FIG. 3 is a side view of a head suspension assembly comprising the load beam of FIGS. 1 and 2;

FIG. 4 is an enlarged cross-sectional view of the load beam of FIG.1 taken along line 4—4;

FIG. 6 is a top plan view of the load beam of FIG. 5;

FIG. 7 is a side view of a head suspension assembly comprising the load beam of FIGS. 5 and 6;

FIG. 10 is a top plan view of still another load beam according to the present invention.

Similar numerals refer to similar elements in the drawing. It should be understood that the sizes of the different components in the figures may not be in exact proportion, and are shown for visual clarity and for the purpose of explanation.

DETAILED DESCRIPTION OF THE INVENTION

Figure 1:
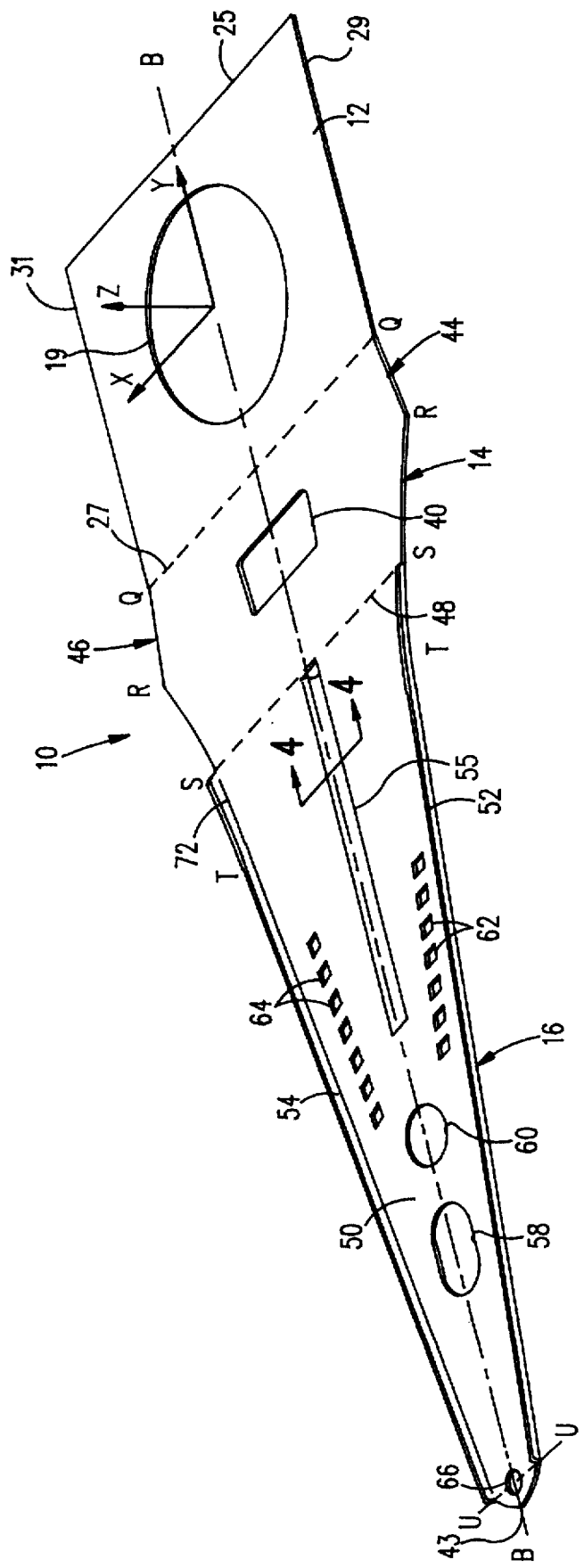
FIG. 1 is an isometric view of a HGA load beam according to the present invention.

In FIG. 1, a load beam 10 comprises a square-shaped base plate attachment segment 12 which extends to a bend region 14 and projects forward to a forward section 16. The load beam 10 is typically etched as a single piece from stainless steel sheet stock or another suitable material.

The base plate attachment segment 12 has a circular central opening 19 for receiving a boss 21 of a base plate 23, as shown in FIG. 3. The base plate attachment segment 12 is defined by a rearward edge 25, and a forward edge 27 parallel to the rearward edge 25 and delineated by a hypothetical line QQ shown in dashed lines. Two side edges 29, 31 that join the rearward edge 25 and the forward edge 27 are located symmetrically relative to the central axis B—B. In another embodiment, these side edges may be positioned at an angle relative to the central axis B—B.

FIG. 3 illustrates an HGA 33 incorporating the load beam 10. The bend region 14 provides the load beam 10 with the desirable spring force for preloading the HGA 33 and opposes the air bearing force generated by the floating action of the head or slider 36 over a rotating magnetic disk. In the present embodiment the bend region 14 increases the in-plane or lateral, stiffness of the load beam 10, along the X-Y plane direction, in order to improve the dynamic performance of the HGA 33. As a result, the in-plane resonance frequency improves the HGA 33 positioning in high areal density disk drive applications.

The bend region 14 includes a window 40 that assists in adjusting the out-of-plane (i.e., the Z direction which is normal to the lateral plane) spring force of the load beam 10, so that appropriate load may be applied to the slider 36 while flying over the rotating magnetic disk. The window 40 is shown to be trapezoidally shaped, but it can assume any other polygon or arcuate shape. Alternatively, multiple windows may be distributed throughout the bend region 14. The window 40 may be eliminated partially or completely. The thickness of the bend region 14 may be reduced by etching it to a desired thickness, in order to obtain the desirable spring force for each specific application. In the present illustration the window 40 is symmetrically disposed relative to the load beam central axis B—B.

Another feature of the bend region 14 is to shift the center of gravity of the load beam 10 from the forward edge 27 of the base plate attachment segment 12 to a distal tip 43 toward the rearward edge 25 along the central axis B—B. The rearward shift of the center of gravity will improve the overall shock performance of the HGA 33. The window 40 is sized and positioned in the bend region 14, so as to relocate the center of gravity to a more desirable rearward position, and further to provide an appropriate spring force to the load beam 10.

The desired lateral stiffness of the load beam 10 is achieved by the novel shape and geometric configuration of the bend region 14. The bend region 14 is wider than the base plate attachment segment 12, in order to increase the stiffness of the load beam 10 in the in-plane (X-Y plane) direction.

The bend region is formed at an angle relative to the surface of the base plate attachment segment 12. The bend region 14 is defined by the forward edge 27 of the base plate attachment segment 12, two side edges 44, 46, and a forward edge 48 delineated by a hypothetical line SS.

The side edges 44 and 46 are symmetrical relative to the central axis B—B of the load beam 10, and therefore only one side edge, i.e., side edge 44, will be described in detail. The side edge 44 is formed of two segments: a first segment QR and a second segment RS. However, it should be clear that the side edge 44 may alternatively include a different number of segments or shapes, provided it is wider than the base plate attachment segment 12. For instance, the side edge 44 may be arcuately shaped.

In the example illustrated in FIG. 2, segment QR of side edge 44 is straight, and defines an angle "a" with the central axis B—B. Angle "a" may range between 3.5 degrees and 7 degrees; however, other values may alternatively be adapted. The length of segment QR may vary with the specific applications. Segment RS may be straight or have an arcuate shape.

The position of points R, and the value of angle "a" may be adjusted in conjunction with the size, dimensions and position of the window 40, in order to optimize the static and dynamic performance of the HGA, and further to shift the center of gravity of the load beam 10 rearward, while minimizing its mass.

The forward section 16 extends from the bend region 14, and from the forward edge 48 (dashed line S—S) to the narrower distal or forwardmost tip 43. The forward section 16 is formed of a tapered forward section plate 50; two side rails 52, 54; a central channel 55; tooling holes 58, 60; two sets of side openings 62, 64; and a dimple 66.

An objective of the novel design is to increase the first torsion frequency mode and possibly the second torsion frequency mode by minimizing the mass of the forward section 16, while still maintaining a high stiffness to mass ratio. This objective is achieved in part, by providing the forward section 16 with two curved sections 70 and 72 that are symmetrical relative to the central axis B—B. Each curved section 70, 72 extends between two points S and T, with a curvature corresponding to that of the adjacent curved segment RS. The radius of curvature of each segment RT may vary between 0.35 inch and 0.65 inch. An exemplary curvature is 0.5 inch. As a result of this design, the torsional frequency of the load beam 10 is increased to satisfy a desirable objective of the present invention.

In a preferred embodiment of the present invention, it is desirable to remove an optimum amount of mass from the forward section 16, by minimizing its width, particularly at the distal end U—U. However, the width of the distal end U—U is limited by the dimension of the dimple 66. In an implementation of the invention, the dimple 66 is approximately 15 mils (0.015 inch) in diameter. The shape of the forward section 16 contributes to a reduction in the overall mass of the load beam 10, thus increasing the resonant frequency of the first torsion resonant mode. The tapered forward section 16 is also significant for increasing the resonant frequency of the second torsion resonant mode.

The length of the forward section 16 varies with respect to the total length of the load beam 10. A shorter forward section 16 can be employed, thereby further reducing the mass of the load beam 10. Such a design may require that the actuator arm (not shown), to which the boss 21 is swaged, be extended for a given disk drive design. An advantage in increased resonant frequencies is obtained with the present invention over prior art head suspension assemblies using load beams.

The side rails 52, 54 are stiffening flanges that run substantially the length of the forward section 16. The side rails 52, 54 serve to stiffen the load beam 10 so that all bending in the out-of-plane direction is essentially at the bend regions with minimal deformation at the distal end U—U. By using the design of the present invention, the height of the side rails 52, 54 can be decreased, and still achieve equal or higher resonant frequencies than prior art devices. For example, in known prior art load beams, the height of such side rails or flanges would be 0.014 inch. With the present design, for load beams used in a comparable environment, the flange heights are made to be from 0.008–0.0095 inch (a 40–32 percent decrease in height). This is advantageous because it permits closer spacing between disks platters in a disk drive, resulting in a more compact drive or a drive having a greater number of disks. When used in combination with a flexure 81 (FIG. 3) and the slider 36, a substantial reduction in disk head assembly height can be achieved, resulting in even more compact drives or drives having a greater number of disks.

With reference to FIG. 4, the central channel 55 helps to increase the overall stiffness of the load beam 10, and more particularly the stiffness in the out-of-plane or Z bending direction and in the torsion direction (turning motion around the major axis of the load beam 10). Another feature of the central channel 55 is to help in locating the center of gravity of the HGA 33 in proximity to or on the plane of the load beam 10, in order to reduce the excitation in the torsion modes of the load beam 10.

Generally, the center of gravity of a conventional HGA is not necessarily located within the plane of the load beam, but is offset in the out-of-plane direction. An important feature of the present invention is that the center of gravity of the HGA 33 may be positioned within the plane of the load beam 10.

The central channel 55 is formed of a single continuous straight trough that extends along the central or major axis B—B of the load beam 10. The central channel 55 may be located at any position along the major axis or central axis B—B, between the edge of the window 40 in the bend region 14 and the circular tooling hole 60. The channel 55 is located in the nodal area of the first torsion vibration mode of the load beam 10, which is an area of the load beam 10 that does not move much in the first torsion mode of vibration.

In one embodiment, the channel 55 tapers as it progresses toward the tooling hole 60. For instance, the width of the rearward end of the channel 55 may vary from 0.010 inch to 0.025 inch, with the forward end varying between 0.005 inch and 0.020 inch. In another embodiment the channel 55 is uniform along its entire axial length. The depth (in the out-of-plane direction of the load beam) may vary between 0.002 inch and 0.010 inch depending on the thickness of the material used to form the load beam 10.

While the central channel 55 is shown to be formed of a single continuous trough, it should be clear that in an alternative embodiment the central channel 55 may be formed of a series of adjacent troughs. In yet another alternative, the central channel 55 is not a trough or a depression, but is rather embossed or raised. In still another embodiment, the central channel 55 may be formed of a combination of a series of adjacent or alternating troughs and raised sections. Some or all of these troughs and/or raised sections may be collinear with the major axis of the load beam 10, or alternatively, they may be offset relative thereto.

The side openings 62, 64 are symmetrical relative to the central axis B—B of the load beam 10. The openings 62, 64 may have any desired shape even though they are illustrated in FIGS. 1 and 2 as being a square-shaped section. In a preferred embodiment, the openings 62, 64 are located outside the nodal area of the first torsion vibration mode of the load beam 10. A typical size of a single opening is approximately 0.010 inch by 0.010 inch. While seven openings 62, 64 are illustrated on each side of the forward section 16, it should be clear that a different number of openings may be alternatively selected.

These side openings 62, 64 assist in reducing the overall mass of the HGA 33 and in positioning the center of gravity of the HGA 33 along the central axis of the load beam 10, closer to the base plate attachment segment 12. Generally, the reduction in the overall mass is beneficial to increase the frequencies of all vibration modes, and in particular the first torsion frequency, it being understood that the vibration frequencies are inversely proportional to mass and directly proportional to stiffness. The side openings 62, 64 are specifically located where the ratio of stiffness to mass is low for the vibration modes of interest, including the first torsion mode of load beam 10. Another advantage of having the center of gravity of the HGA 33 located as far rearward as possible is to render the HGA 33 more shock resistant, that is, to increase the amount of shock force required to separate the magnetic head from the disk, which improves disk drive performance.

Figure 5:
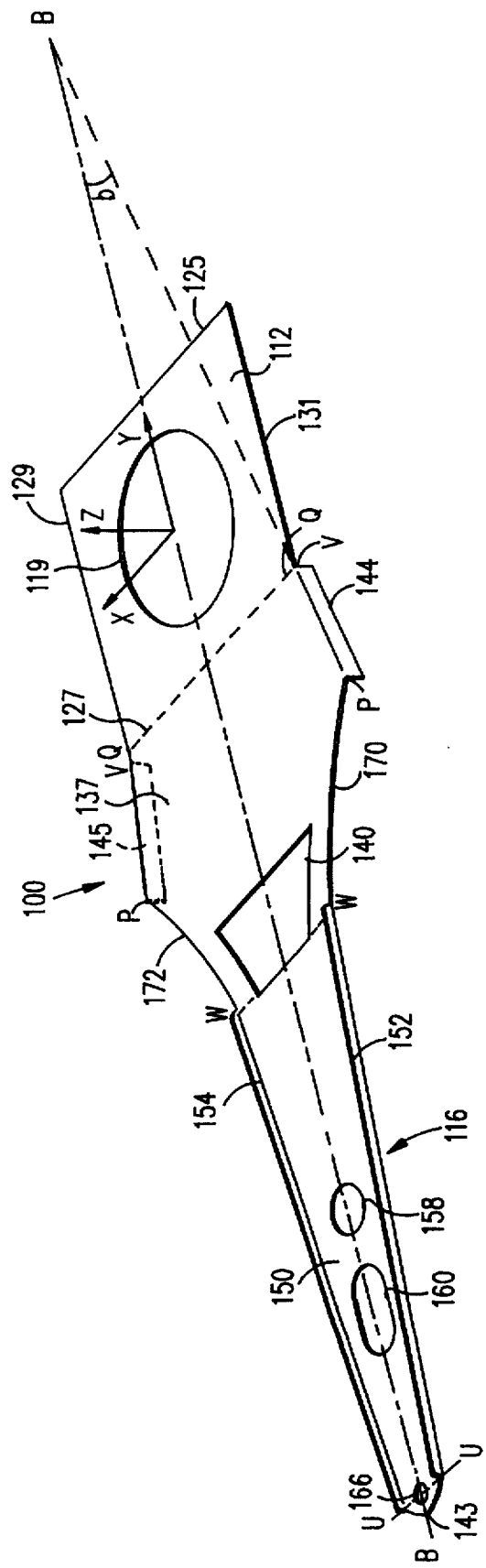
FIG. 5 is an isometric view of another load beam according to the present invention.

FIGS. 5 and 6 illustrate a load beam 100 comprising a base plate attachment segment 112 which extends to a bend region 114 and which projects forward to a forward section 116. The load beam 100 is typically formed as a single piece from stainless steel sheet stock or another suitable material.

The base plate attachment segment 112 has a circular central opening 119 for receiving a boss 121 of a base plate 123, as shown in FIG. 7. The base plate attachment segment 112 is defined by a rearward edge 125, and a forward edge 127 parallel to the rearward edge 125, and delineated by a hypothetical line QQ shown in a dashed line. Two side edges 129, 131 that join the rearward edge 125 and the forward edge 127 are located symmetrically relative to the central axis B—B. In another embodiment, the side edges 129, 131 may be positioned at an angle relative to the central axis B—B.

FIG. 7 illustrates an HGA 133 incorporating the load beam 100. The bend region 114 provides the load beam 100 with the desirable spring force for preloading the HGA 133 and opposes the air bearing force generated by the floating action of the head or slider 136 over a rotating magnetic disk. In the present embodiment an intermediate region 137 extends integrally from the base plate attachment segment 112, and is disposed between the base plate attachment segment 112 and the bend region 114 as delineated by the hypothetical line PP shown in a dashed line in FIG. 6. The intermediate region 137 increases the in-plane or lateral, stiffness of the load beam 100, along the X-Y plane direction, in order to improve the dynamic performance of the HGA 133. As a result, the in-plane resonance frequency improves the HGA 133 positioning in high areal density disk drive applications.

The intermediate region 137 includes two symmetrical and substantially identical side flanges 144, 145 (see FIG. 5), each of which extends from a rear point or edge V to a forward point or edge P. Flanges 144, 145 increase the stiffness of the load beam 100 in the out-of-plane bending mode, and further increase the stiffness of the load beam 100 in torsion. The height of each flange 144, 145 ranges between approximately 7 to 10 milli-inches; however, other values may also be used. The height of flanges 144, 145 does not exceed the thickness of the slider 136.

Another feature of the intermediate region 137 is to shift the center of gravity of the load beam 100, from the forward edge 127 of the base plate attachment segment 112 to a distal tip 143 (FIG. 6), rearward, toward the edge 125, along the central axis B—B. The rearward shift of the center of gravity will improve the overall shock performance of the HGA 133. While the effective moment arm in a conventional load beam 100 is determined by the distance between the tip 143 and forward edge 127 of the base plate attachment segment 112, an object of the present invention is to reduce the moment arm by the length of the intermediate region 137. In the present example the length of the intermediate region 137 is defined as the distance between lines PP and QQ along the central axis B—B. The shortening of the moment arm enables the achievement of improved dynamic performance characteristics of the load beam 100 in the in-plane, out-of-plane, and torsion directions.

The desired lateral stiffness of the load beam 100 is achieved by the novel shape and geometric configuration of the intermediate region 137. The width of the intermediate region 137, that is the distance between the two flanges 144, 145, gradually increases from line QQ to line PP, in order to increase the stiffness of the load beam 100 in the in-plane (X-Y plane) direction.

The intermediate region 137 is preferably co-planar with the surface of the base plate attachment segment 112. The intermediate region 137 is defined by QQ, that is the forward edge 127 of the base plate attachment segment 112, two segments QP, and line PP. Segments QP are symmetrical relative to the central axis B—B of the load beam 100, and therefore only one segment QP will be described in detail. Segment QP is formed of 31 two segments: a first segment QV and a second segment VP. The first segment QV does not include a flange in order to provide a clearance between the flange 144 and the base plate attachment segment 112. The flange 144 is formed along the second segment VP. It should be clear that segment QP may alternatively include a different number of segments or shapes, provided it is wider than the base plate attachment segment 112. For instance, segment QP may be arcuately shaped.

In the example illustrated in FIG. 5, segment QV is straight, and defines an angle "b" with the central axis B—B.

Angle "b" may range between 3.5 degrees and 8 degrees; however, other values may alternatively be used. The length of segment QV may vary with specific applications. Segment VP may be straight or may have an arctuate shape. The position of points P, and the value of angle "b" may be adjusted in order to optimize the static and dynamic performance of the HGA 133, and further to shift the center of gravity of the load beam 100 rearward, while minimizing its mass.

The bend region 114 includes a window 140 that assists in adjusting the out-of-plane (i.e., the Z direction which is normal to the lateral plane) spring force of the load beam 100, so that appropriate load may be applied to the slider 136 while flying over a rotating magnetic disk. The window 140 is shown to be trapezoidally shaped, but it can assume any other polygon or arcuate shape. Alternatively, multiple windows may be distributed throughout the bend region 114. The window 140 may be eliminated partially or completely. The thickness of the bend region 114 may be reduced by etching it to a desired thickness, in order to obtain the desirable spring force for each specific application. In the present illustration the window 140 is symmetrically disposed relative to the load beam central axis B—B.

An objective of the present novel design is to increase the first torsion frequency mode and possibly the second torsion frequency mode by minimizing the mass of both the bend region 114 and the forward section 116, while still maintaining a high stiffness to mass ratio. This objective is achieved in part, by providing the bend region 114 with two curved sections 170 and 172 that are symmetrical relative to the central axis B—B. Each curved section 170, 172 extends between two points P and W. The radius of curvature of each segment PW may vary between 0.35 inch and 0.65 inch. An exemplary curvature is 0.5 inch. As a result, the torsional frequency of the load beam 100 is increased to satisfy a desirable objective of the present invention.

The forward section 116 extends from a forward edge 148 (defined by a hypothetical dashed line WW) of the bend region 114 to the distal or forwardmost tip 143. The forward section 116 is formed of a tapered forward section plate 150; two side rails 152, 154; cooling holes 158, 160; and a dimple 166.

In a preferred embodiment of the present invention, it is desirable to remove an optimum amount of mass from the forward section 116, by minimizing its width, particularly at the distal end U—U. However, the width of the distal end U—U is limited by the dimension of the dimple 166. In an implementation of the invention, the dimple 166 is approximately 15 mils (0.015 inch) in diameter. The shape of the forward section 116 contributes to a reduction in the overall mass of the load beam 100, thus increasing the resonant frequency of the first torsion resonant mode. The tapered forward section 116 is also significant for increasing the resonant frequency of the second torsion resonant mode.

The length of the forward section 116 varies with respect to the total length of the load beam 100. A shorter forward section 116 can be employed, thereby further reducing the mass of the load beam 100. Such a design may require that the actuator arm (not shown), to which the boss 121 is swaged, be extended for a given disk drive design. An advantage in increased resonant frequencies is obtained with the present invention over prior art head suspension assemblies using load beams.

The side rails 152, 154 are stiffening flanges that run substantially the length of the forward section 116. The side rails 152, 154 serve to stiffen the load beam 100 so that all bending in the out-of-plane direction is essentially at the bend regions with minimal deformation at the distal end U—U. By using the design of the present invention, the height of the side rails 152, 154 can be decreased, and still achieve equal or higher resonant frequencies than prior art devices. For example, in known prior art load beams, the height of such side rails or flanges would be 0.014 inch. With the present design, for load beams used in a comparable environment, the flange heights are made to be from 0.008–0.0095 inch (a 40–32 percent decrease in height). This is advantageous because it permits closer spacing between disks platters in a disk drive, resulting in a more compact drive or a drive having a greater number of disks. When used in combination with a flexure 181 (FIG. 7) and the slider 136, a substantial reduction in disk head assembly height can be achieved, resulting in even more compact drives or drives having a greater number of disks.

Figure 8:
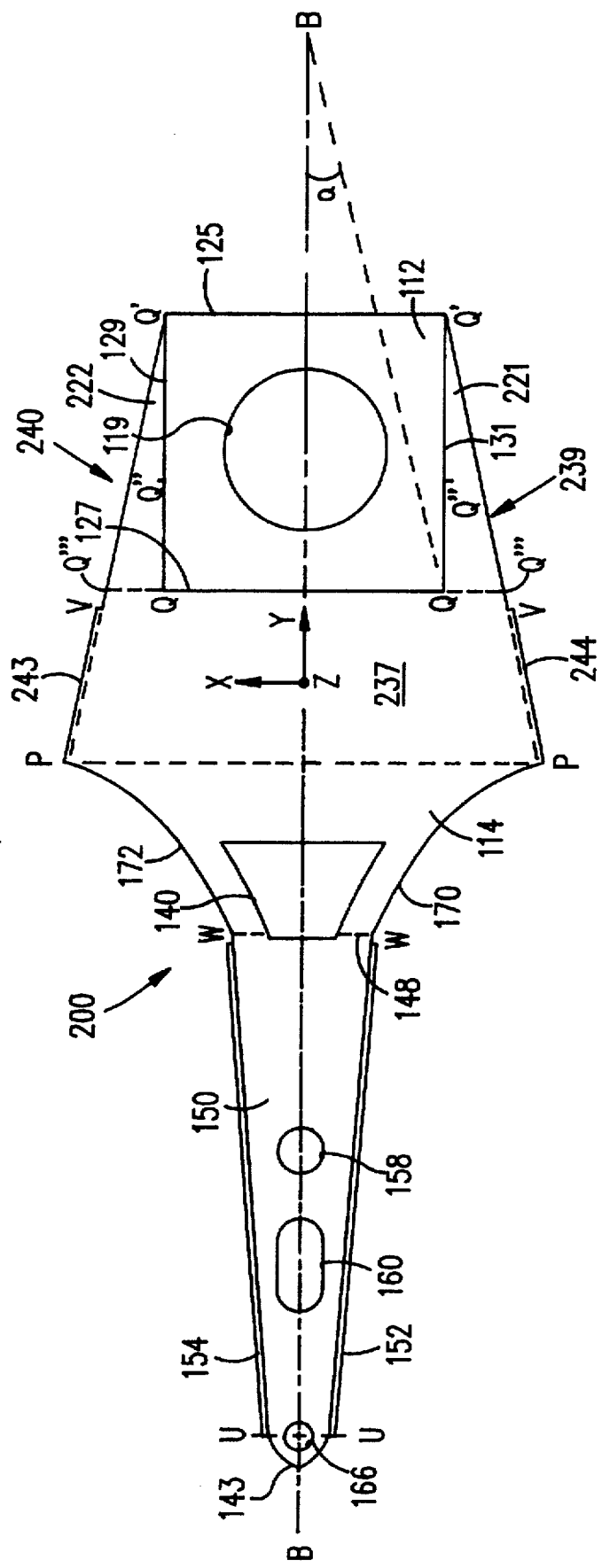
FIG. 8 is a top plan view of still another load beam according to the present invention.

FIG. 8 shows another load beam 200 which is generally similar to the load beam 100 of FIG. 6, with similar numerals referring to similar components. The load beam 200 includes an intermediate region 237 which is defined by the hypothetical lines PP and Q'''Q'''. In addition, the load beam 200 includes two triangular anchoring regions 221, 222 defined by the vertices Q'''QQ'. The anchoring regions 221, 222 are symmetrically disposed relative to the central axis B—B. In this embodiment, two rear flanges 243, 244 extend alongside part of the intermediate region 237 from point P to point V. In another embodiment the rear flanges 243, 244 may extend from point P to point Q', or to any point therebetween. The embodiment illustrated in FIG. 8 further improves the out-of-plane, lateral, and torsional load beam stiffness values.

Figure 9:
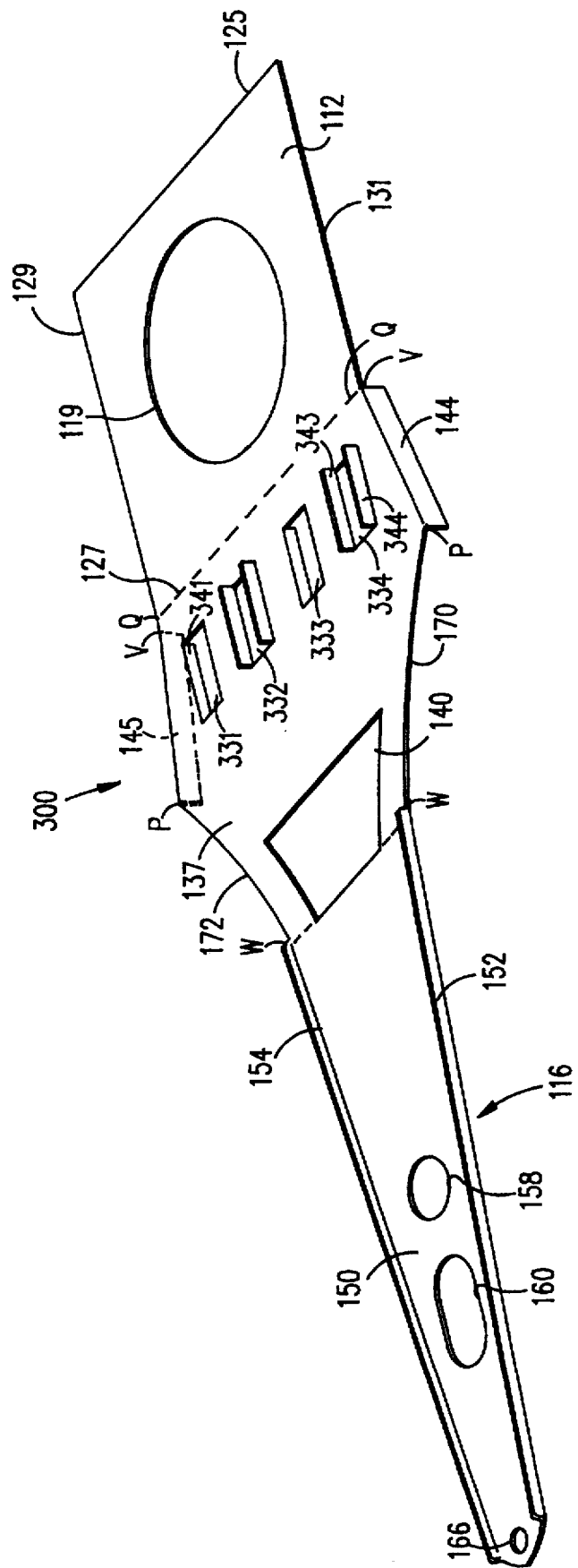
FIG. 9 is an isometric view of yet another load beam according to the present invention.

FIG. 9 shows another load beam 300 which is generally similar to the load beam 100 of FIG. 5, with similar numerals referring to similar components. The load beam 300 includes an intermediate region 314 which is similar to the intermediate region 114, in which one or more windows are formed. In this particular illustration four windows 331, 332, 333, 334 are formed within the intermediate region 314 in order to provide means for adjusting stiffness. To this end, each of these windows 331-334, includes two stiffening flanges, such as flanges 341 (for window 331) and 343, 344 (for window 334). These flanges may have the same orientation, such that all of these flanges 331-334 may be directed either upwardly or downwardly. Alternatively, some of the flanges may be oriented upwardly and others may be oriented downwardly. In the specific illustration shown in FIG. 9 the flanges have alternating orientations.

FIG. 10 shows another load beam 400 which is generally similar to the load beam 10 of FIG. 2, with similar numerals referring to similar components. The load beam 400 includes a bend region 414 is defined by the hypothetical line QQ', two side edges 444, 446, and a forward edge 48 delineated by a hypothetical line SS.

The side edges 444 and 446 are symmetrical relative to the central axis B—B of the load beam 400, and therefore only one side edge, i.e., side edge 444, will be described in detail. The side edge 444 is formed of two segments: a first segment RG and a second segment RQ'. However, it should be clear that the side edge 444 may alternatively include a different number of segments or shapes, provided it is wider than the base plate attachment segment 12. The length of segment RG may vary with specific applications. In addition, the load beam 400 includes two triangular anchoring regions 461, 462 defined by the vertices QQ'G. The anchoring regions 461, 462 are symmetrically disposed relative to the central axis B—B, and improve the out-of-plane, lateral, and torsional load beam stiffness values.

There has been described herein a load beam which has low profile side rails, a low effective mass, and a low mass moment of inertia. The present design may be used to reduce disk spacing in disk drives.

It should be understood that the geometry and dimensions described herein may be modified within the scope of the invention. For example, the widths and lengths of the various components of the load beam 100 may be modified depending upon the disk drive operating characteristics. Other modifications may be made when implementing the invention for a particular application. Furthermore, the present invention can be used with different types of sliders and having different sizes. The present inventive concept may also be used in conjunction with optical and magneto-optical disk drives.

What is claimed is:

1. A load beam for use in a head gimbal assembly comprising:

a base plate attachment segment;

an intermediate region extending integrally from said base plate attachment segment;

said intermediate region formed of at least a first segment that is wider than said base plate attachment segment;

a bend region extending integrally from said intermediate region for providing the load beam with a predetermined preload spring force and for increasing the lateral stiffness of the load beam; and a forward section extending from said bend region, so that the center of gravity of said bend region and forward section is shifted toward said base plate attachment segment for improving the shock performance of the load beam, and so that a moment arm of said bend region and said forward section is shortened;

wherein said intermediate region is co-planar with said base plate attachment segment; and wherein said bend region includes two sections that curve inwardly towards said forward section and which are symmetrically disposed relative to a central axis of the load beam for increasing the first torsion frequency mode by minimizing the mass of both said bend region and said forward section, while maintaining a high stiffness to mass ratio.

2. A load beam according to claim 1, wherein said bend region includes a window that assists in adjusting the out-of-plane spring force of the load beam.

3. A load beam according to claim 1, wherein said forward section includes a tapered forward section plate, two side rails, and a tooling hole.

4. A load beam according to claim 1, wherein said intermediate region includes two side edges that are symmetrically disposed relative to said central axis, and that extend adjacent to two side edges of said base plate attachment segment.

5. A load beam according to claims 1, wherein said intermediate region includes one or more windows.

6. A load beam according to claim 5, wherein each of said one or more windows includes at least one stiffening flange.

7. A load beam according to claim 6, wherein said at least one stiffening flange comprises a plurality of flanges that have the same orientation.

8. A load beam according to claim 6, wherein said at least one stiffening flange comprises a plurality of flanges that have opposite orientations.

9. A load beam according to claim 6, wherein said at least one stiffening flange comprises a plurality of flanges that have alternating orientations.

10. A load beam for use in a head gimbal assembly comprising in combination:

a base plate attachment segment;

an intermediate region extending integrally from said base place attachment segment;

said intermediate region formed of at least a first segment that is wider than said base plate attachment segment;

a bend region extending integrally from said intermediate region for providing the load beam with a predetermined preload spring force and for increasing the lateral stiffness of the load beam; and a forward section extending from said bend region, so that the center of gravity of said bend region and forward section is shifted toward said base plate attachment segment for improving the shock performance of the load beam, and so that a moment arm of said bend region and said forward section is shortened;

wherein said intermediate region includes two symmetrical and substantially identical side flanges that increase the stiffness of the load beam in the out-of-plane bending mode.

* * * * *